United States Patent [19]

Box

[11] 4,342,393
[45] Aug. 3, 1982

[54] STACKABLE POULTRY COOP

[75] Inventor: Thomas Box, Shrewsbury, N.J.

[73] Assignee: Spectrum International, Inc., Shrewsbury, N.J.

[21] Appl. No.: 180,815

[22] Filed: Aug. 25, 1980

[51] Int. Cl.³ .................. B65D 21/02; B65D 1/30; B65D 43/16

[52] U.S. Cl. .................... 206/504; 119/19; 206/509; 206/511; 206/512; 220/23.4; 220/334; 220/338

[58] Field of Search .............. 206/504, 509, 510, 511, 206/512, 597; 119/19; 220/4 B, 4 E, 23.4, 72, 334, 337, 338, 339

[56] References Cited

U.S. PATENT DOCUMENTS

| | | | |
|---|---|---|---|
| 2,560,376 | 7/1951 | Waterman | 220/339 |
| 2,677,479 | 5/1954 | Kiba | 220/338 |
| 2,733,830 | 2/1956 | Ruskin | 220/338 |
| 3,091,357 | 5/1963 | Weinhart | 220/334 |
| 3,217,919 | 11/1965 | Long | 220/334 |
| 3,407,961 | 10/1968 | Box | 220/337 |
| 3,754,676 | 8/1973 | Box | 220/334 |
| 3,802,595 | 4/1974 | Frahm | 206/511 |
| 3,966,084 | 6/1976 | Box | 220/334 |
| 3,987,829 | 10/1976 | Leone | 220/72 |
| 3,989,140 | 11/1976 | Crane | 206/597 |

FOREIGN PATENT DOCUMENTS

| | | | |
|---|---|---|---|
| 1048429 | 2/1979 | Canada | 220/72 |
| 1558547 | 1/1969 | France | 206/512 |

Primary Examiner—George E. Lowrance
Attorney, Agent, or Firm—Lerner, David, Littenberg & Samuel

[57] ABSTRACT

A stackable poultry coop comprising upper and lower wall sections joined by a plurality of side sections to form an enclosure, at least one of the wall sections including an access opening adapted to be closed by a door. Complementary male and female locking members are disposed on the outer surface of a pair of oppositely disposed sidewall sections for providing lateral interlockability of the coops when a plurality of coops are arranged in side-by-side relationship, the male and female locking members extending out from the outer surface of the sidewall sections a predetermined distance so that when the coops are arranged in side-by-side abutting relationship, the male locking members are slidably received within the female locking members on the adjacent coops with the amount of overlap of the male locking members within the female locking members being equal to the sum of the predetermined distances which each of the male and female locking members extend outwardly from the outer surface of the sidewall sections. Also, the improved coop includes first and second reinforced pad means on the upper and lower wall sections in vertical alignment with the sidewall sections so that when the coops are arranged in vertical stacked relationship, the reinforced pad means are adapted to engage one another so that substantially the entire weight of the coops are borne by the sidewall sections of the coops. Still further, improved door mounting means are provided for the coop which comprise rod means disposed along an edge of an access opening and U-shaped hinge members disposed along a corresponding edge of the door, the U-shaped hinge members having side arms defining a recess for receiving a portion of the rod means therebetween and the side arms of at least one of the U-shaped members including protruding portions defining a gap therebetween which is less than the diameter of the rod means.

29 Claims, 12 Drawing Figures

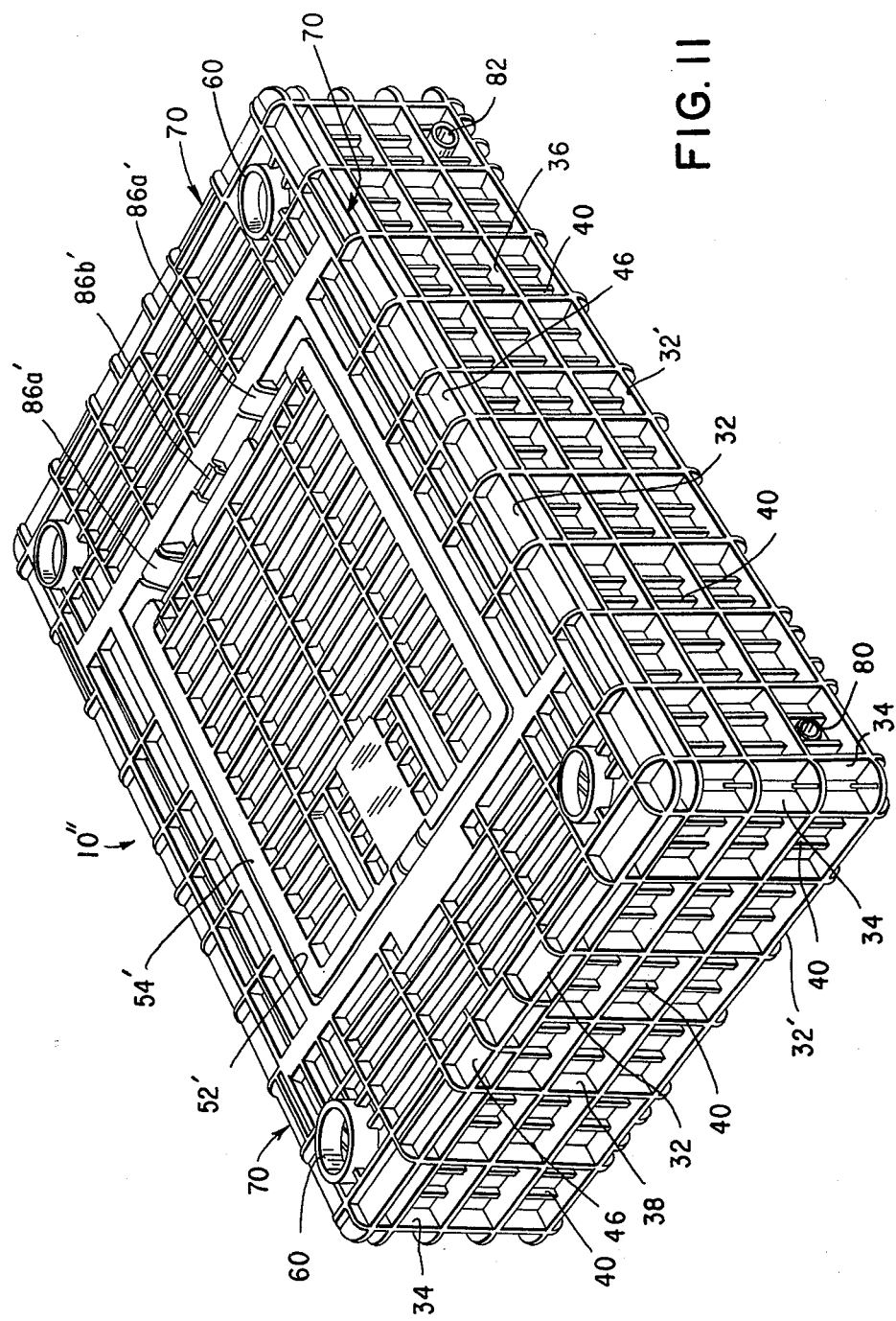

STACKABLE POULTRY COOP

FIELD OF THE INVENTION

The present invention relates to stackable animal transport cages and the like, and more particularly, to a stackable poultry coop used for making truckload shipments of live poultry.

BACKGROUND OF THE INVENTION

For convenience in handling and to minimize injury, poultry is usually shipped in cages or coops, each holding a plurality of chickens, for example from six to fifteen. These coops are conventionally of wire or wooden lattice work construction throughout with heavy wood rectangular frames strong enough to bear the weight of other cages stacked to a height of six to eight feet, or higher. More recently, it has become known to fabricate animal transport or poultry coops in the form of integrally molded plastic structures consisting of a lightweight and high impact synthetic plastic material, such as for example polyethylene or polypropylene. Such coops essentially comprise a plurality of sidewalls joined to generally planar upper and lower wall sections to define an enclosure for the poultry. Also, the coops generally include an access opening in one of the walls (usually the upper wall) through which the live poultry is placed into the coops. Hinged lids or doors are also provided for closing the access opening to prevent loss of poultry during shipment.

In order to maximize the number of coops, and thus the number of animals which may be transported, it is desired to stack or arrange the coops in the most compact arrangement, and in particular to provide for vertical and lateral stackability of the coops. However, as can be appreciated, the higher the vertical stack of coops, the greater weight which is placed on the lowermost coops in the stack. For instance, with ten coops stacked vertically on top of one another and each coop loaded with poultry weighing approximately seventy to seventy-five pounds, the lowermost coop in the stack would have to be capable of bearing a weight on the order of 700 pounds. This weight results not only from the weight of the coops themselves, but also from the weight of the poultry enclosed therein. Still further, when the coops are loaded onto the transport vehicle, chains or straps are placed over the top of the vertically stacked coops and tightly secured to the vehicle to prevent the coops from falling off the vehicle during transport, thereby further increasing the downwardly directed load on the coops. With many prior art arrangements the entire downwardly directed load is somewhat evenly distributed across the entire coop such that the bottom or lower wall section of the coops tends to sag or bow downwardly against the upper wall section of the immediately beneath coop. Additionally, this may cause sagging or bowing of the sidewalls also. This is particularly a problem on hot summer days with coops made of plastic since the plastic may soften and sag under the heat and load applied to the coops. Since the poultry is often tightly compacted in a small space or enclosure (for example fifteen chickens in a two foot by two foot by four foot cage), this sagging can result in damage to the chickens or other poultry housed therewithin and/or damage to the coops themselves so that they can not be readily reused. A further consideration in this regadrd is the fact that it is desired to maximize the open space of the walls of the coop in order to provide for maximization of air flow into the coop so that healthy live poultry is delivered to the slaughtering or processing plant. Thus, while some of these problems of sagging could be minimized with relatively closed, substantial bottom wall sections and top wall sections to provide for increased structural support, there would be a consequent minimization of open area for air flow therethrough which is most undesirable.

Another problem experienced with prior art poultry coops has been the loss or damage of poultry at the breeding farm when the poultry are placed in the coops and loaded on the transport vehicle. Specifically, in order to provide for ease in handling of the coops by the personnel who collect and place the poultry into the coops, the coops are generally individually loaded and then a plurality placed on a pallet or other support structure in a stacked arrangement. Thereafter the plurality of coops are then loaded onto the transport vehicle by means of a forklift or open bed truck. Since the coops are not firmly held in place in the stacked arrangement on the forklift or open bed truck, the coops tend to fall from the stack, thereby resulting in damaged and/or lost poultry. While prior art coop arrangements have provided means for increasing the vertical stackability and maintaining the vertical stacks during the collection and loading operations, prior art arrangements have not provided for any lateral interlocking of the coops to prevent spilling or tipping of the coops during loading, and in particular have not provided for relatively simple locking means or devices on the coops which does not require great care, skill or time in locking the coops in a lateral arrangement or stack.

A further drawback of the prior art devices relates to the doors or lids which are hingedly supported on the coops to close the access opening. Oftentimes with plastic coops and doors, metal hinge pins or bars have been utilized about which the plastic hinge members rotate. However, after some use, because of the incompatibility of the plastic and the metal, the plastic hinge members often break. As can be appreciated, if the doors become lost during transport or do not properly function, poultry may be lost, and further, the reusability of the coop is limited. Therefore, it will be appreciated that it is desired to provide for a convenient hinge mechanism which is relatively inexpensive and which has a useful life corresponding to the intended life of the coops.

These and further disadvantages of the prior art are overcome with the improved stackable poultry coop in accordance with the present invention.

SUMMARY OF THE INVENTION

In accordance with the present invention there is provided a stackable coop comprising upper and lower wall sections joined by a plurality of sidewall sections to form an enclosure, the sidewall sections being disposed about and joined to the upper and lower wall sections and including first and second sidewall sections which are oppositely disposed. Complementary male and female locking members are disposed on the outer surface of each of the first and second oppositely disposed sidewall sections for providing for lateral interlockability of the coops when a plurality of coops are arranged in side-by-side relationship with the first and second sidewalls of adjacent coops being juxtaposed and in an abutting relationship to one another. The complementary male and female locking members on each of the first and second sidewalls extend out from the outer surface of the sidewalls a predetermined distance, and the male locking members are sized to be mateably received within one of the female locking members. Also, the male and female locking members are disposed in predetermined positions on the oppositely disposed first and second sidewall sections so that the male locking members of adjacent juxtaposed coops are slidably received within the female locking members on such juxtaposed coops to lock the coops together, the amount of overlap of the male locking members within the female locking members being equal to the sum of the predetermined distances which each of the male and female locking members extend outwardly from the outer surface of the sidewall sections. Additionally, the improved coop in accordance with the present invention includes a plurality of complementary first and second reinforced pad means on the upper and lower wall sections respectively in vertical alignment with the sidewall sections spaced about the periphery thereof. The plurality of first pad means disposed about the upper surface of the upper wall section define a plurality of resting pads thereon, and the plurality of second pad means disposed on the lower surface of the lower wall section are in vertical alignment with the plurality of the first pad means to define a plurality of support pads, the support pads being adapted to rest on the resting pads so that when a plurality of coops are stacked vertically one on top of the other, substantially the entire weight of the stacked coops above one of the coops is borne by the sidewall sections of the one coop. Further, the improved coop includes an access opening in one of the wall sections, and a door and door mounting means for mounting the door in the opening for movement between opened and closed positions. The door mounting means comprises rod means disposed along an edge of either the door or the wall section having the opening therein, and hinge means disposed along a corresponding edge of the other of the door and the section having the opening therein. The hinge means comprise a plurality of U-shaped members each having side arms defining a recess for receiving a portion of the rod means therebetween. The side arms of at least one of the U-shaped members include protruding portions defining a gap therebetween which is less than the diameter of the rod means so that the portion of the rod means associated therewith is firmly held in place in the recess by the protruding portions.

In accordance with a preferred embodiment, the laterally extending complementary male and female locking members for providing lateral stability and locking when a plurality of coops are arranged in side-by-side juxtaposed abutting relationship, each extend out from the outer surface of the sidewall section the same predetermined distance. Further in accordance with the present invention, the reinforced pad means on the upper and lower wall sections include a plurality of ribs, the ribs on the upper wall section being transversely disposed with respect to the ribs on the lower wall section so that substantially the entire weight of the coops above one of the coops is borne on the ribs of the immediately beneath coop. Still further in accordance with a preferred embodiment, the recesses of the U-shaped hinge members are aligned along a common axis, and the side arms of one of the hinge members is angularly displaced about the common axis relative to the side arms of the other U-shaped members.

These and further features and characteristics of the present invention will be apparent from the following detailed description in which reference is made to the enclosed drawings which illustrate preferred embodiments of the present invention.

BRIEF DESCRIPTION OF THE DRAWINGS

FIG. 11 is a top perspective view illustrating an alternative arrangement for the access opening and the door therefor in accordance with the present invention.

DETAILED DESCRIPTION OF THE PREFERRED EMBODIMENT

Figure 1:
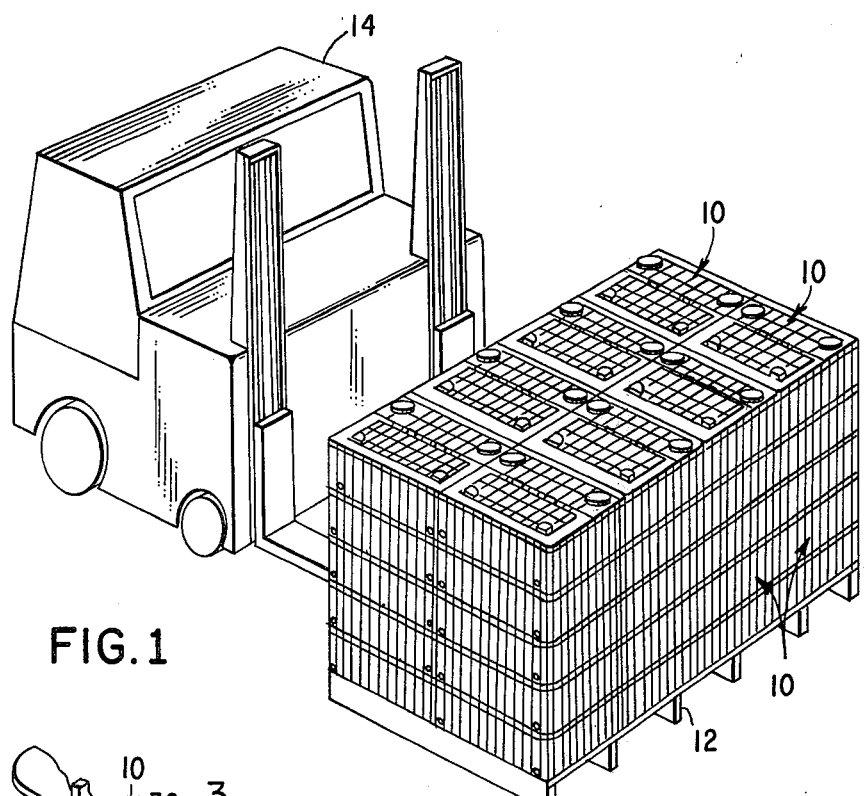
FIG. 1 is a perspective view of a plurality of coops in accordance with the present invention arranged in stacked relationship on a pallet about to be lifted by a forklift truck.

Referring now to the drawings wherein like reference characters represent like elements, there is shown in FIG. 1 a plurality of poultry coops 10 in accordance with the present invention arranged in stacked relationship and supported on a pallet 12 carried by a forklift truck 14. As noted in the Background of the Invention hereinabove, poultry coops are utilized for the transport of live poultry, generally from the breeding farm to the processing plant. The poultry cages or coops are for convenience in handling the poultry during shipment, and also serve to minimize injury of the poultry during such shipment. To minimize space and to maximize the number of birds which may be transported, the coops 10 are designed to hold a plurality of poultry animals, and further are constructed so as to be stackable in a tightly nested or compact arrangement during shipment. As often the breeding farms are not readily accessible to the main transport vehicle and/or to provide for ease in loading of the stackable coops 10, a plurality of chickens are initially loaded into each poultry coop 10, and then a plurality of coops 10 are stacked on pallets 12 which are then loaded by means of for example a forklift truck 14 onto the main transport vehicle (not shown) which may be a large shipping truck adapted to carry hundreds of stacked coops 10. As can be appreciated, since a number of animals are to be loaded into each coop 10 and since the plurality of coops 10 are to be stacked on the main shipping vehicle, the use of a forklift truck 14 for loading of the coops 10 provides a convenient means for accomplishing the loading. For instance, if coops 10 are to be arranged in stacks four wide and ten high on the main vehicle, then the forklift truck 14 may conveniently be used to load onto the main shipping vehicle a plurality of coops 10 arranged in stacks four wide and five high, such as shown in FIG. 1.

The poultry coops 10 in accordance with the present invention preferably are constructed of molded plastic, such as for example out of polyethylene or polypropolyene. Each of the coops 10 is comprised of two basic components 20, 22 which are assembled together to provide an enclosure for the poultry. One component is a base member 20 which comprises a generally rectangular open box-shaped structure, and the other component comprises a cover structure 22. The base member 20 comprises four sidewall sections 26, 28 joined to define a rectangular-shaped sidewall enclosure and an integral bottom wall section 30. The entire base member 20 may preferably be molded as a one piece unit. The sidewall sections 26, 28 are each of an overall open latticework construction having outer peripheral frame members 32, 34 and a plurality of horizontally extending and vertically extending spaced ribs 36, 38, 40 interconnected together and arranged within the outer peripheral frame members 32, 34. The outer frame members 32, 34 and the horizontally extending ribs 36 are generally all of the same depth (i.e., equivalent to the overall thickness of each of the sidewall sections 26, 28), whereas the vertically extending ribs 38, 40 are of two types—one 38 having a depth approximating the thickness of the wall sections 26, 28 and the other 40 being of a lesser depth. This arrangement is preferable as it minimizes the weight of the coop 10 while at the same time providing the required structural strength for the coop 10. It should be noted that the open latticework arrangement of the sidewall sections 26, 28 is preferable in order to maximize the amount of air flow into the interior of the structure so that healthy and live poultry are delivered to the processing plant.

The integral bottom wall section 30 is also of a open latticework construction comprising a plurality of perpendicularly extending support beams 42 of a relatively substantial construction with a plurality of smaller dimensioned ribs 44 extending therebetween to provide a suitable base for the poultry when loaded into the coop 10. The outer periphery of the bottom wall section 30 is defined by the adjacent horizontal frame members 32' of the sidewall sections 26, 28. Preferably, the edges of all of the rib members 36, 38, 40, 42, 44 for each wall section 26, 28, 30 (i.e., each sidewall section 26, 28 and the bottom wall section 30) on the inside of the coop 10 lie in a common plane so as to provide a relatively smooth inner wall surface (as opposed to a ribbed surface) in order to prevent damage to the poultry during shipment, while at the same time providing the required sufficient supporting structure for supporting the weight of the poultry therein.

The second main component of the coop 10 comprises a cover member 22 which may be joined to the base member 20 by any suitable means, such as for example plastic rivets and/or interlocking tabs arranged to be received in appropriate slots, as is known in the industry. The cover member 22, as with the base member 20, is comprised of a series of peripheral frame members 46, 48 having a plurality of transversely extending support ribs 50 extending thereacross to prevent egress of the poultry after they have been loaded into the coop 10. These outer peripheral frame members 46, 48 are arranged to overlie the vertical sidewall sections 26, 28 respectively of the base member 20 and, in accordance with the preferred embodiment, define a generally rectangular-shaped frame between the sides of which the transversely extending ribs 50 extend.

A suitable access opening 52 is also defined within the cover member 22 for loading of poultry into the coop 10. The access opening 52 is adapted to be closed by a suitable door 54 which is also of an open latticework construction comprised of a plurality of rib members 56 extending between peripheral frame members 58. The access opening 52 may preferably be provided adjacent one edge and extend between the two ends, such as for example shown in FIGS. 1 and 6, or a central access opening 52' may be provided such as shown in the alternative arrangement of FIG. 11.

In order to provide for vertical stackability of the coops 10, as is conventional, suitable locating means may be provided on the upper and lower surfaces of the coops 10 so that each coop 10 may be supported in alignment on top of another coop 10 to thereby form a stack such as shown in FIG. 1. For example, the upper surface of the cover member 22 may be provided with molded protruding sleeve members 60, 62 which are adapted to fit within complementary socket members 64 provided in the surface of the bottom wall section 30 of another coop 10 to provide an effective arrangement for maintaining the proper vertical stacking position of the coops 10 one on top of another. In this regard, in the embodiment shown in FIGS. 5 and 6, there are provided four protruding sleeve memberse 60, 62 on the top wall section 22 of the coop 10 arranged adjacent the four corners of the coop 10. Two of these upwardly extending sleeve members 60 are of a cylindrical nature, and the other two 62, provided on the door 54, are of a somewhat partial cylindrical construction. The socket members 64 in the bottom wall section 30 of the poultry coop 10 (shown in FIG. 5) merely comprise generally square-shaped sockets or recesses 64 defined between four rib members 42. Each socket 64 has four protruding ribs 66 therein adapted to engage against the sides of the sleeve members 60, 62 when the coops 10 are stacked one on top of the other. That is, the two cylindrical members 60 on the upper wall section 22 of the coop 10 are adapted to be received within two of the square sockets 64 having protruding ribs 66 on the bottom wall section 30 of an immediately above coop 10 of a stack of coops 10 with the four protruding ribs 66 engaging against the sides of the sleeves 60, and the other upwardly extending locating sleeve members 62 are adapted to be received within the other two sockets 64 on the bottom wall section 30 of the overlying coop 10, the locating members 62 being engaged by preferably three of the protruding rib members 66 of the sockets 64 when the coops 10 are arranged in a vertical stack.

This arrangement provides a convenient means for locating and maintaining the coops 10 in vertical stacked relationship so that the coops 10 are stacked directly one on top of the other. Also, although different sleeve members 60, 62 may be provided on the top wall section 22, the disclosed arrangement allows for convenience in manufacturing and also does not require that the coops 10 be oriented in any special position other then to precisely overlie the immediately beneath coop 10 when same are stacked. That is, each of the sockets 64 on the bottom wall section 30 of the coops 10 are identical and are adapted to receive and hold in place the sleeve members 60, 62 on the immediately beneath coop 10 of the stacked arrangement, irrespective of whether the upwardly extending sleeve members 60, 62 are cylindrical or of an arbitrary shape such as the sleeve members 62 on the door element 54.

When a plurality of coops 10 are stacked vertically one on top of the other, for example eight or ten high in a stack, and in particular when such coops 10 are stacked on a transport vehicle and then chained down by means of chains passing from the sides of the truck up and over the stacks, a relatively large downward force may be applied to the stack of coops 10, not only from the chains but also from the weight of the coops 10 and poultry located therein. For example, if fifteen chickens are loaded in each coop 10, each coop 10 may weigh on the order of seventy-five pounds. Thus, with coops 10 stacked ten high, the weight on the bottom coop 10 would be at least on the order of 700 pounds, plus the load applied by the hold-down chains or straps. With prior art arrangements in which the weight is distributed evenly across the bottom surface of the coops, there is a tendency for the coops to sag a significant amount, particularly if the coops are made of a molded plastic material and exposed to the heat of the sun during hot summer days. Such sagging may cause a problem in the reusability of the coops, e.g., stacking of the coops in subsequent use, as well as possibly damaging the poultry in the lowermost coops in the stack.

Figure 5:
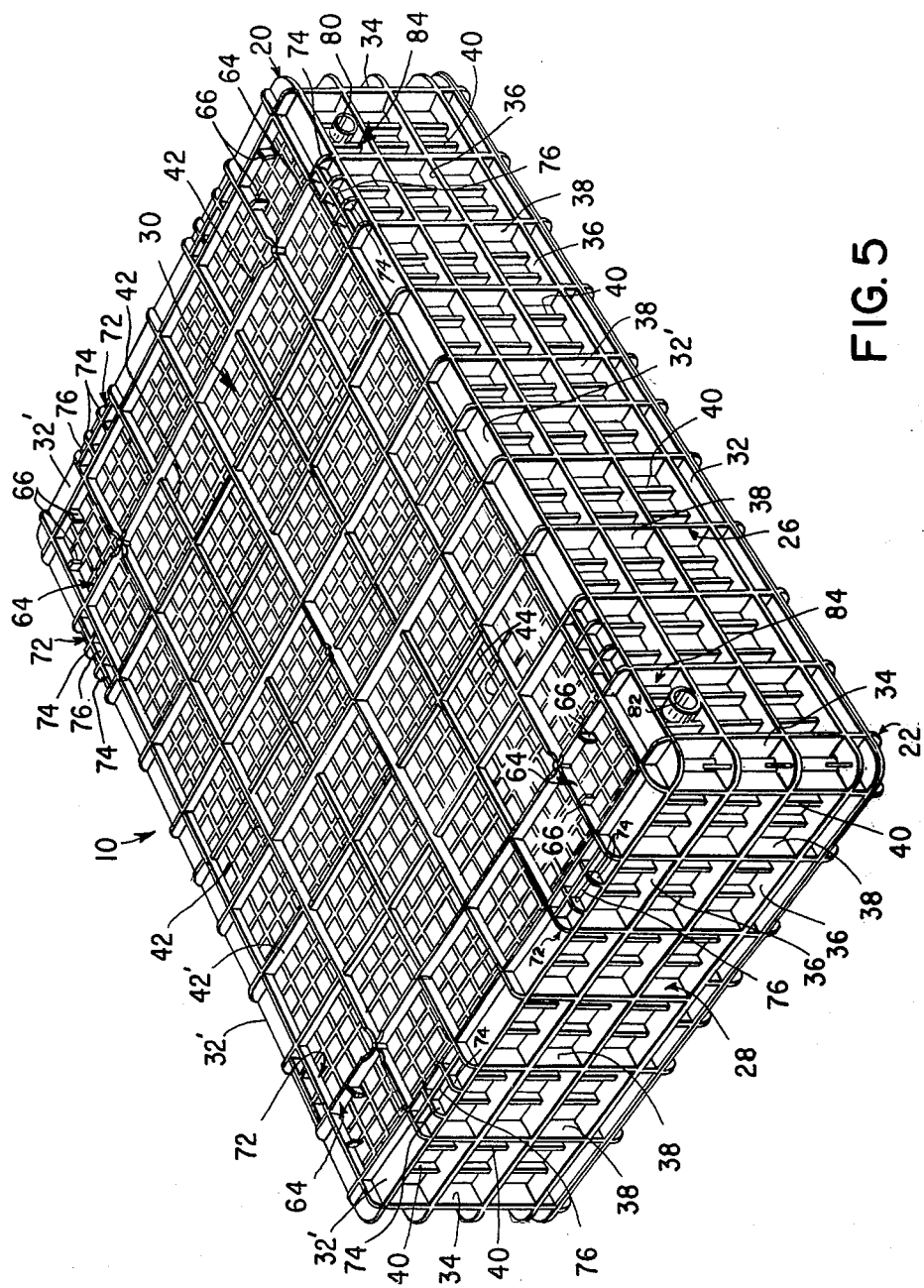
FIG. 5 is a bottom perspective view of the coop in accordance with the present invention.
Figure 6:
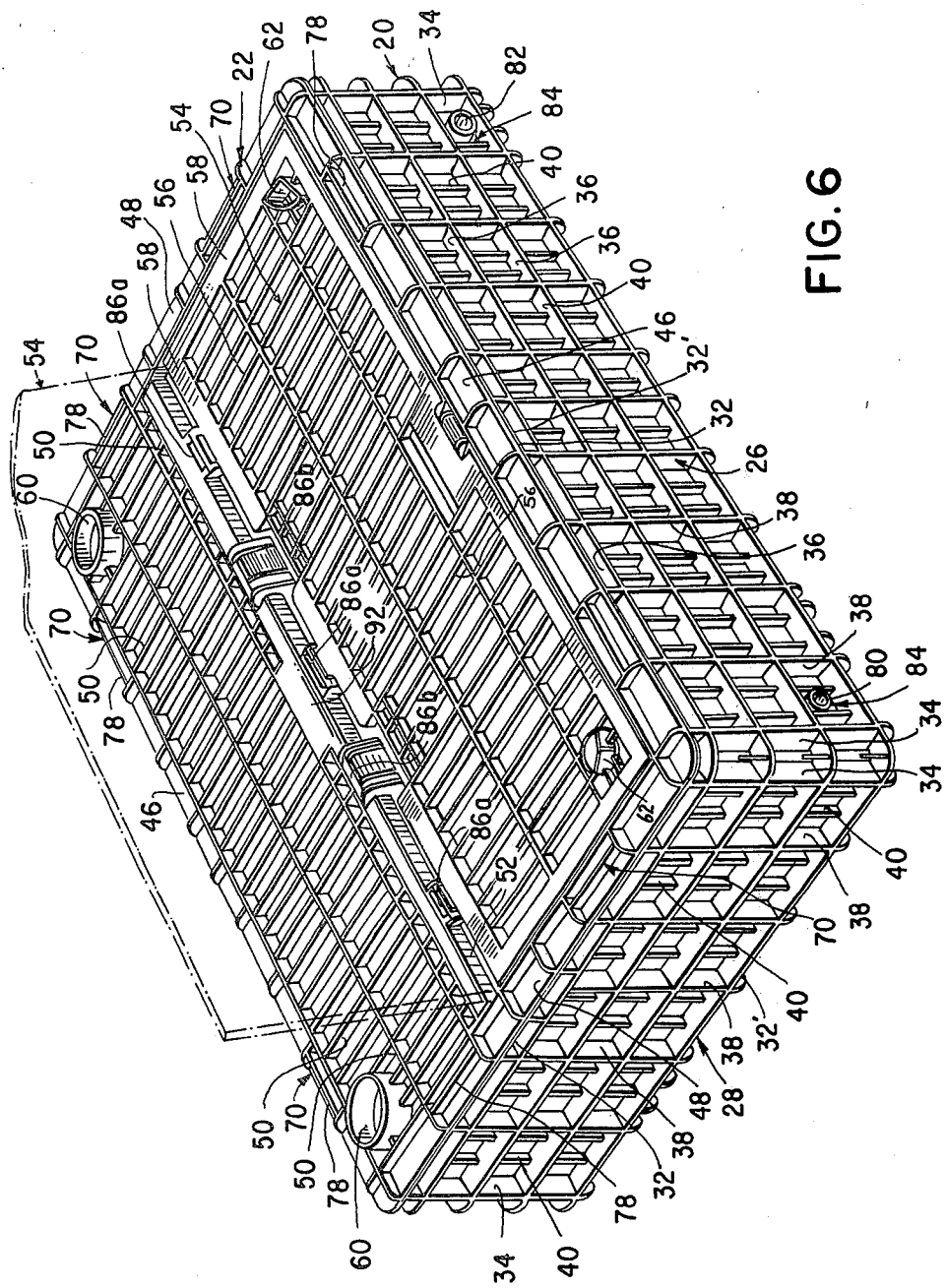
FIG. 6 is a top perspective view of the coop in accordance with the present invention and illustrating in solid outline a door for an access opening at the top thereof in its closed position and in dotted outline the door in its open position.
Figure 7:
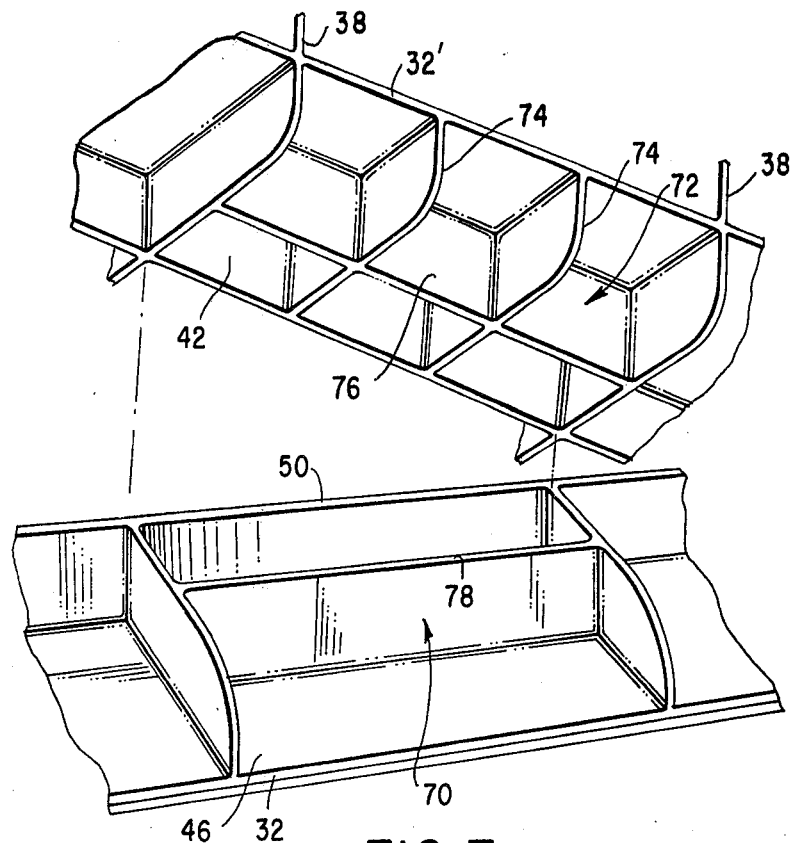
FIG. 7 is an exploded perspective view showing portions of two coops in vertical stacked relationship to illustrate the reinforced pad means thereof.
Figure 8:
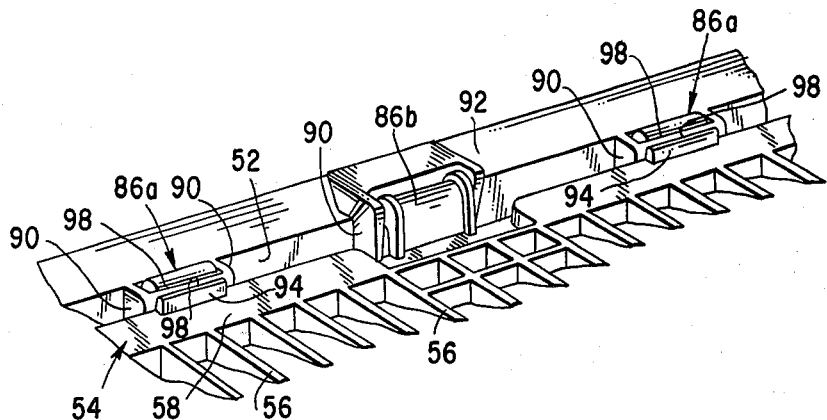
FIG. 8 is a partial perspective view of a door hingedly mounted to the coop in accordance with the present invention.
Figure 9:
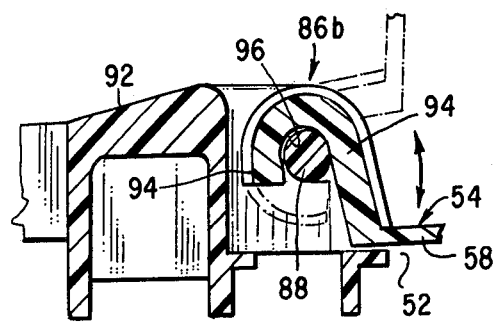
FIG. 9 is a cross-sectional view illustrating one hinge member for hingedly mounting the door to the coop in accordance with the present invention, the closed position of the door being shown in solid outline and the open position of the door being shown in dotted outline.

In accordance with the present invention, this problem is overcome by providing means for ensuring that substantially the entire weight of the coops 10 is supported by the sidewall sections 26, 28 of the coops 10 as opposed to being distributed evenly across the lateral dimension of the coops 10 and in particular across the central, relatively less supported section. This supporting means in accordance with the present invention comprises reinforced pads or locations 70, 72 provided about the peripheral edges of the upper and lower sections 22, 30 in vertical alignment with the relatively strong sidewalls 26, 28 of the coop 10. More particularly, as best seen in FIGS. 5 and 6, a plurality of reinforced pad sections 72 are provided about the peripheral beams or frame members 32' defining the perimeter of the bottom wall section 30 of the coop 10. In the preferred embodiment, there are two reinforced pads 72 along and in vertical alignment with each of the sidewall sections 26, 28. These lower reinforced pad sections 72 comprise a plurality of reinforcing plastic ribs 74, 76. For instance, on the bottom wall section 30, each pad location 72 is provided with a plurality of additional transversely extending rib members 74 (two in number) and an additional longitudinally extending rib member 76 between the extensions of the rib members 42 defining the gridwork of the bottom wall section 30.

On the upper surface of the cover member 22, there are also provided eight reinforced pad sections 70 precisely aligned with the pad locations 72 provided on the bottom wall section 30 of the base member 20. The reinforced pad sections 70 on the cover member 22 comprise an additional longitudinally extending rib 78 between a pair of transverse rib members on the frame members 46, 48 of the cover member 22, as shown in FIG. 6. By virtue of this arrangement of reinforced pad sections 70, 72, when the coops 10 are stacked one on top of the other, the ribs 74, 76 of the reinforced pad sections 72 on the bottom wall section 30 rest and are supported in engagement with the ribs 78 of the pad sections 70 on the cover member 22 of the coop 10 immediately therebeneath.

The rib members 74, 76, 78 at the reinforced pad sections 70, 72 do not protrude from the plane of the outer surface of the bottom wall section 30 or cover section 22, but merely serve as reinforced locations for engagement by other suitable reinforced locations on the coops 10 in the vertical stacked arrangement. It has been found that this arrangement provides and ensures that the coops 10, when loaded with poultry and placed on transport vehicles and held down by chains, will not sag since substantially the entire weight of the stack of coops 10 is borne by the reinforced sections 70, 72 and transmitted through the relatively strong sidewalls 26, 28 of the coops 10 therebeneath. Thus, the reinforcing ribs 74, 76, 78 in essence serve to prevent the sagging experienced with prior art arrangements. An important feature of these reinforcing ribs 74, 76, 78 is the fact that transversely extending ribs 74 are adapted to engage and rest on longitudinally extending reinforcing ribs 78 of the immediately adjacent coop 10 in the vertical stacked arrangement. It will be apparent that the transversely extending ribs 74, although shown to be on the bottom wall section 30 of the coop 10 in the preferred embodiment, could instead be placed on the cover section 22 with the longitudinally extending reinforcing ribs 78 provided on the outer surface of the bottom wall section 30.

Also in accordance with the present invention, there is means for providing lateral stability and locking of the coops 10 when they are stacked in side-by-side relationship, and in particular for preventing or at least minimizing tipping or spilling of the coops 10 as they are loaded such as for example with the use of a forklift truck 14 or the like. Specifically, lateral locking means 80, 82 are provided to minimize the possibility of loaded coops 10 falling off the forklift 14 as they are transported for loading onto the main transport vehicle. As can be appreciated, this spilling is most undesirable since the poultry in the coops 10 might otherwise be injured or bruised.

More particularly, as best seen in FIGS. 2–5, in accordance with the present invention there are provided complementary male and female locking members 80, 82 on each of the two oppositely disposed sidewall sections 26 of the coop 10. These male and female locking members 80, 82 comprise slidably mating sleeves or cylindrical members which are integrally formed at predetermined positions on the sidewall sections 26. The male locking members or sleeves 80 are adapted to be slidably received within the female locking members or sleeves 82 of the adjacent coop 10' when the coops are arranged in side-by-side juxtaposed abutting relationship. Similarly, the female locking sleeves 82 on each of the sidewall sections 26 are adapted to receive a male locking sleeve 80 of the adjacent coop 10' when the coops 10 are arranged in side-by-side abutting juxtaposed relationship. Each of the male and female locking sleeves 80, 82 extend laterally outwardly from the outer surface of the sidewall sections 26 a small predetermined distance to provide the required holding force for maintaining lateral stability.

Figure 2:
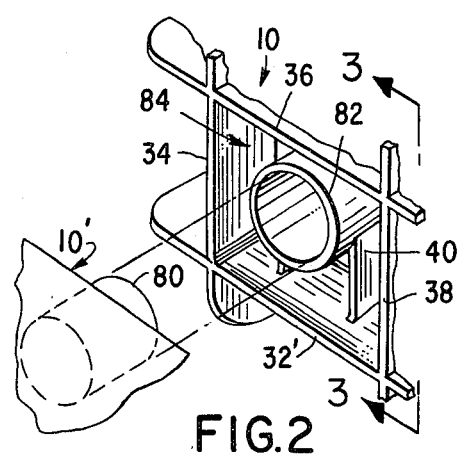
FIG. 2 is an exploded perspective view of portions of two coops in accordance with the present invention, illustrating the lateral locking means thereof.
Figure 3:
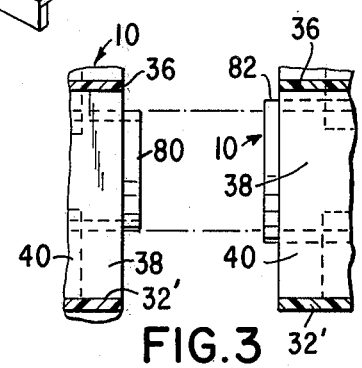
FIG. 3 is a side elevational view taken along line 3—3 of FIG. 2 of portions of a pair of coops in accordance with the present invention, the coops being spaced apart prior to being placed in juxtaposed, abutting relationship.
Figure 4:
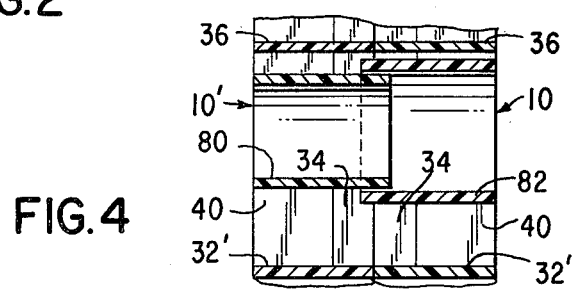
FIG. 4 is a side sectional view of portions of a pair of coops in side-by-side juxtaposed abutting relationship, similar to FIG. 3.

More specifically, as can best be seen in FIGS. 2-4, the male and female locking sleeves 80, 82 are both integrally formed in recesses 84 defined between a pair of horizontal ribs 32', 36 and a pair of thick vertical rib members 34, 38 and extend outwardly therefrom. For instance, the sleeves 80, 82 could be integral with the vertical rib members 40 in the recesses 84. Thus, it will be appreciated that when the coops 10 are arranged in side-by-side relationship with the outer surfaces (defined by the outer edges of the frame members 32, 34 and the horizontally and vertically extending ribs 36, 38) abutting one another, the male locking sleeve 80 is slidably received within the circular recess formed in the female locking sleeve 82 of the adjacent coop 10', and the cylindrical female locking sleeve 82 protrudes into the recessed area 84 surrounding the male locking sleeve 80 of the adjacent coop 10'. By virtue of this arrangement, it will thus be appreciated that the amount of overlap of the male and female locking sleeves 80, 82 is equal to the sum of the distances that each of the male and female locking sleeves 80, 82 protrude outwardly from the outer surface of the coop 10. In the preferred embodiment, this predetermined distance is the same for both the male and female locking sleeves 80, 82 and is approximately one-eighth inch for a coop having approximate overall dimensions of approximately 33 inches long, 24 inches wide and 10½ inches high. Thus, the amount of overlap in accordance with the preferred embodiment is ¼ inch.

This ¼ inch overlap for the slidably received cylindrical sleeves 80, 82 has been found to ensure or at least minimize the possibility of the coops 10 moving laterally apart from one another and tipping off of the pallet 12 when carried by a forklift 14 and in essence has provided for lateral locking or maintaining of the coops 10 in side-by-side relationship. At the same time, it will be appreciated that this arrangement provides for ease in assembly and disassembly of the coops 10 from the side-by-side juxtaposed abutting relationship since the coops 10 may simply be slid from the side into and out of side-by-side abutting relationship.

Also, it is to be noted that the male and female locking sleeves 80, 82 are each disposed on the sidewall sections 26 in the lower half thereof and at positions adjacent the ends of the coop 10. Further, the male and female locking sleeves 80, 82 are provided at the same locations on each of the two lateral oppositely disposed sidewall sections 26 so that it is not necessary that the coops 10 be oriented in any particular position when they are loaded onto the loading pallet 12 other than the fact that a similarly sized wall section 26 be juxtaposed to a side wall section 26. That is, the coops 10 could be turned end-to-end with the cover member 22 still remaining on top and the coops 10 would still be in position to be locked in side-by-side relationship. This greatly enhances the efficiency in loading of poultry coops 10 on a loading pallet 12 and/or transport vehicle.

It should also be appreciated that the male locking sleeves 80 should be dimensioned so as to be easily received in slidable mating engagement within the female locking sleeves 82, i.e., the male locking sleeves 80 should not be dimensioned so as to cause binding during insertion into the female locking sleeves 82 which might otherwise require a relatively great force to lock the coops 10 together. It is possible to achieve good lateral stability and locking by virtue of the amount of overlap of the sleeves 80, 82 and not because of any catches or latches. Also, while locking sleeves 80, 82 which extend a greater distance out from the sidewall sections 26 could be provided, it is desired to minimize the extent of protrusion since too great a protrusion may create problems in binding or may become broken off when unloaded coops 10 are stored in a haphazard fashion. Thus, it is desired to minimize the amount of protrusion from the sidewall sections 26 while at the same time providing sufficient protrusion to ensure lateral stability. It has been found that the approximate one-eighth inch extension from the outer surface of the sidewall sections 26 of the coop 10 achieves both of these objectives.

Still further in accordance with the present invention there is provided an improved hinge mounting for the door 54 in the access opening 52 in the cover member 22. In accordance with the preferred embodiment, both the door hinges 86a, 86b and the hinge pins 88 are made of plastic, in contrast to many prior art arrangements which utilize metal pins. Although metal pins could be utilized, they are not preferred since the engagement of plastic with metal often causes deterioration of the plastic with eventual cracking of the plastic hinge members and loss of doors 54. As can be appreciated, this is most undesirable since it also eliminates reuse of the coop 10 and/or the requirement of providing new doors, as well as possible loss of chickens during transport.

In accordance with a preferred embodiment, the access opening 52 is provided adjacent one of the edges of the coop 10 and extends approximately the entire length of the coop 10. Alternatively, the access opening 52' could be centrally located on the cover member 22, such as shown in FIG. 11. With the enlarged longitudinally extending access opening 52, five rod members or hinge pins 88 held between transversely disposed ribs 90 are spaced at equal distances along a substantial rib member 92 which defines a longitudinal edge of the opening 52. These rod members 88 extend inwardly of the access opening 52 a slight distance from the frame member 92. The hinge pins or rod sections 88 are adapted to be received within recesses of five U-shaped hinge members 86a, 86b provided along one edge of the door member 54. If only a central access opening 52' is provided in the coop 10, three hinge pins 88 and three hinge members 86a, 86b could be utilized, such as for example shown in the alternate arrangement for the coop 10" in FIG. 11.

The U-shaped hinge members 86a, 86b on the door member 54 each comprise a pair of upstanding side arms 94 which define therebetween a recess 96 for receiving an associated hinge pin 88. Each of the recessed openings 96 of the U-shaped hinge members 86a, 86b are disposed along a common axis to receive the rod members 88 provided along the edge of the opening 52 in the top cover member 22. Three of the U-shaped hinge members 86a are disposed so that the side arms 94 extend in a direction substantially away from the coop 10 when the door is closed, whereas the other two hinge members 86b are disposed so that the side arms 94 extend in a direction toward the interior of the coop 10, i.e., 180° opposite from the direction that the side arms 94 of the three hinge members 86a extend.

Additionally, the three hinge members 86a are each provided with protruding portions 98 on the inside surfaces of the side arms 94 thereof which extend toward one another to define a gap 100 which is less than the diameter of the rod section 88 to be received therein. It will thus be appreciated that by forcing of these side arms 94 over the associated rod sections 88, the rod sections 88 will be tightly retained in the recess 96. Although it is possible that the other two hinge members 86b could also be provided with similar protrusions, it has not been found necessary to do so. That is, with these two hinge members 86b, the side arms do not include any protrusion and are spaced from one another a distance substantially corresponding to the diameter of the rod section 88 to be received in the recess 96 thereof so that the rod section 88 associated with these U-shaped members 86b are simply slid into place during assembly. With this arrangement of the U-shaped hinge members 86a, 86b and the provision of the protrusions 98, it has been found that the doors 54 will not fall off of the coops 10 during use and become lost during transport storage and/or utilization during loading. This is a most important advantage since without a door 54 it is not possible to utilize the coop 10 while ensuring that chickens are not lost.

The door 54 may be easily assembled by starting at one end of the longitudinal edge of the coop 10 and forcing the associated rod or hinge pin 88 into the recess 96 of its associated U-shaped hinge member 86a and progressively working toward the opposite end. Because the door 54 is constructed of molded plastic which, although very rigid, has some flexibility, it is possible to bend the door 54 slightly to allow for receipt of the rod sections 88 in each of the U-shaped hinge members 86a, 86b.

It will also be appreciated that by a simple adjustment of the injection mold cavity and in particular the portion of the cavity for forming the U-shaped hinge members 86a, the extent of the protrusions 98 facing inwardly of the side arms 94 can be adjusted as well as the particular contour of such protrusions 98. For instance, simple raised bumps could be provided at the outer extremities of the side arms 94 or as is preferred, the protrusions 98 can extend along the entire longitudinal length of the side arms 94 adjacent the upper end. This simple adjustment, as is well known in the art, on the molding apparatus would simply comprise adjustment to provide a larger or smaller recess in the member defining the recess 96 of the U-shaped hinge members 86a.

Figure 10:
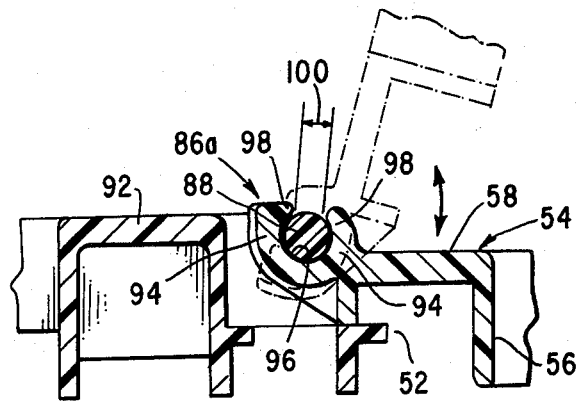
FIG. 10 is a sectional view, similar to FIG. 9, illustrating another hinge member for hingedly mounting the door to the coop in accordance with the present invention, the closed position of the door being shown in solid outline and the open position of the door being shown in dotted outline.
Figure 12:
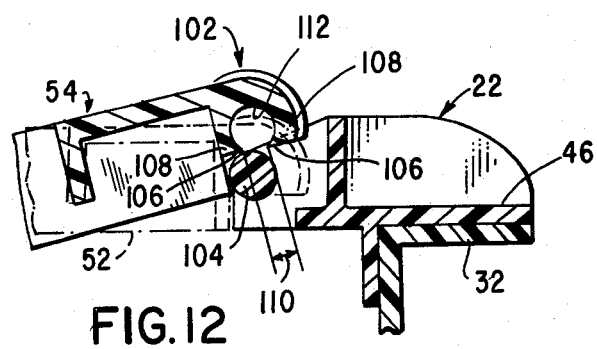
FIG. 12 is a side view illustrating a latching mechanism for the door in accordance with the present invention, the latch mechanism prior to the door being latched being shown in solid outline and the latch mechanism in its latched position being shown in dotted outline.

If a central access opening 52' is provided, such as shown in FIG. 11, only three rod sections 88 and three hinge members 86a, 86b need be provided. In this arrangement, the two end hinge members 86a' would be oriented in an opposite direction to the center hinge member 86b', with the two end hinge members 86a' including protruding portions on the side arms 94 thereof, similar to the hinge member 86a shown in FIG. 10.

Also in accordance with the present invention, there is provided an improved latch mechanism which, as with the remaining part of the coop 10, is formed entirely of plastic material which may be injection molded. The improved latch mechanism is very similar to the hinge members 86a and rod sections 88 utilized for providing hinge type swinging movement of the door 54 on the coop 10. More particularly, the latch mechanism includes a U-shaped member 102 formed on the edge of the door 54 opposite the edge from which the hinges 86a, 86b are formed, and a complementary rod or pin 104 formed along a portion of the longitudinal edge of the opening opposite from the frame section 92 having the hinge rods 88 disposed thereon. As with the hinge members 86a, 86b, the U-shaped member 102 of the latch includes protrusions or protruding parts 106 along the side arms 108 thereof which define a gap 110 at the entrance to the latch recess 112 which is sized to be less than the diameter of the complementary rod section 104 on the coop cover member 22. The protruding portions 106 may simply comprise raised portions adjacent the opposite longitudinal edges of the U-shaped latch mechanism 102 so that the U-shaped latch member 102 may be forced downwardly over the complementary rod or pin 104 to retain the door 54 in a latched or closed position. The extend of the protruding parts 106 can be adjusted in a well known manner to either increase or shorten the gap 110 and thereby provide a larger or smaller holding force. The increased holding force may be desirable when large poultry animals are to be shipped which might otherwise be able to push open the door 54 if a large enough holding force is not provided. Again, as with the hinge members 86a, the protruding portions 106 for the U-shaped latch member 102 can be such as to extend along the entire longitudinal length of the side arms 108.

Accordingly, there is provided in accordance with the present invention a stackable poultry coop 10 which comprises upper and lower wall sections 22, 30 joined by a plurality of sidewall sections 26, 28 to form an enclosure, the sidewall sections 26, 28 being disposed about and joined to the upper and lower wall sections 22, 30 and including first and second sidewall sections 26 which are oppositely disposed. Complementary male and female locking members 80, 82 are disposed on the outer surface of each of the first and second oppositely disposed sidewall sections 26 for providing for lateral interlockability of the coops 10 when a plurality of coops 10 are arranged in side-by-side relationship with the first and second sidewalls 26 of adjacent coops 10, 10' being juxtaposed and in an abutting relationship to one another. The complementary male and female locking members 80, 82 on each of the first and second sidewall sections 26 extend out from the outer surface of the sidewall sections 26 a predetermined distance, and the male locking members 80 are sized to be mateably received within one of the female locking member 82. Also, the male and female locking members 80, 82 are disposed in predetermined positions on the oppositely disposed first and second sidewall sections 26 so that the male locking members 80 of adjacent juxtaposed coops 10, 10' are slidably received within the female locking members 82 on such juxtaposed coops 10, 10' to lock the coops 10, 10' together, the amount of overlap of the male locking members 80 within the female locking members 82 being equal to the sum of the predetermined distances which each of the male and female locking members 80, 82 extend outwardly from the outer surface of the sidewall sections 26. Additionally, the improved coop 10 in accordance with the present invention includes a plurality of complementary first and second reinforced pad means 70, 72 on the upper and lower wall sections 22, 30 respectively in vertical alignment with the sidewall sections 26, 28 spaced about the periphery thereof. The plurality of first pad means 70 disposed about the upper surface of the upper wall section 22 define a plurality of resting pads thereon and the plurality of second pad means 72 disposed on the lower surface of the lower wall section 30 are in vertical alignment with the plurality of the first pad means 70 to define a plurality of support pads, the support pads being adapted to rest on the resting pads so that when a plurality of coops 10 are stacked vertically one on top of the other, substantially the entire weight of the coops 10 above one of the coops 10 is borne by the sidewall sections 26, 28 of the one coop 10. Further, the improved coop 10 includes an access opening 52 in one of the wall sections 22, a door 54, and door mounting means for mounting the door 54 in the opening 52 for opening and closing the opening. The door mounting means comprise rod means 88 disposed along an edge of either the door 54 or the wall section 22 having the opening 52 therein, and hinge means 86a, 86b disposed along a corresponding edge of the other of the door 54 and the section 22 having the opening 52 therein. The hinge means 86a, 86b comprise a plurality of U-shaped members having side arms 94 defining a recess 96 for receiving a portion of the rod means 88 therebetween. The side arms 94 of at least one of the U-shaped members 86a include protruding portions 98 defining a gap 100 therebetween which is less than the diameter of the rod means 88 so that the portion of the rod means 88 associated therewith is firmly held in place in the recess 96 by the protruding portions 98.

While the preferred embodiment of the present invention has been shown and described, it will be understood that such is merely illustrative and that changes may be made without departing from the scope of the invention as claimed.

What is claimed is:

1. A stackable coop comprising:
   upper and lower wall sections joined by a plurality of sidewall sections to form an enclosure, said plurality of sidewall sections being disposed about and joined to said upper and lower wall sections, said plurality of sidewall sections including first and second sidewall sections which are oppositely disposed, and at least one of said upper, lower and sidewall sections including an opening therein;
   complementary male and female locking members disposed on the outer surface of each of said first and second sidewall sections, each of said male locking members extending outwardly away from the outer surface of said sidewall section a first predetermined distance, and each of said female locking members extending outwardly away from the outer surface of said sidewall section a second predetermined distance, each of said male locking members being sized to be mateably received within one of said female locking members, and said male and female locking members being disposed in predetermined positions on said first and second sidewall sections so that when a plurality of said coops are arranged in side-by-side relationship with said first sidewall sections of said coops being juxtaposed and substantially in abutting relationship to said second sidewall sections of coops, said male locking members on said first and second sidewall sections of said juxtaposed coops are mateably received in said female locking members on said second and first sidewall sections of said juxtaposed coops respectively, to lock said juxtaposed coops together, the amount of overlap of said male locking members within said female locking members being equal to the sum of said first and second predetermined distances, and said first and second predetermined distances being such as to substantially prevent said coops from unlocking during transport thereof by a vehicle;
   a plurality of complementary first and second reinforced pad means on said upper and lower wall sections respectively, in vertical alignment with said sidewall sections and spaced about the periphery of said upper and lower wall sections, said plurality of first pad means being disposed in spaced positions about the upper surface of said upper wall section to define a plurality of reinforced resting pads thereon, and said plurality of second pad means being disposed on the lower surface of said lower section in vertical alignment with said plurality of first pad means to define a plurality of reinforced support pads, each of said first reinforced pad means comprising at least one rib member extending in a first direction in relation to the plane of said sidewall section it is in alignment with, and each of said corresponding second pad means comprising at least one rib member extending in a second direction which is traverse to said first direction, said reinforced support pads being adapted to engage and rest on said reinforced resting pads of the coop positioned immediately therebeneath when a plurality of said coops are stacked vertically one on top of the other so that substantially the entire weight of said coops positioned above one of said coops is borne by said sidewall sections of said one coop;
   a door for said opening in said at least one of said upper, lower and sidewall sections; and
   door mounting means for mounting said door in said opening for movement between an open position and a closed position, said door mounting means comprising hinge rod means disposed along a hinge edge of one of said door and said section having said opening therein, and hinge means along a corresponding hinge edge of the other of said door and said section having said opening therein, said hinge means comprising a plurality of U-shaped members having side arms defining a recess for receiving associated portions of said hinge rod means therebetween, and said side arms of at least one of said U-shaped members including protruding portions defining a gap therebetween which is less than the diameter of its associated portion of said hinge rod means so that said associated portion of said hinge rod means is firmly held in place in said recess of said at least one U-shaped member by said protruding portions.

2. The stackable coop of claim 1 wherein said first and second predetermined distances are equal.

3. The stackable coop of claim 2 wherein said first and second predetermined distances are each approximately one-eighth inch.

4. The stackable coop of claim 2 wherein said first and second sidewall sections include recessed portions about said complementary male and female locking members so that when a plurality of said coops are arranged in side-by-side relationship, said male and female locking members extend into said recessed portions surrounding said female and male locking members of said juxtaposed coops.

5. The stackable coop of claim 2 wherein the distance of said predetermined positions of said male and female locking members on said first and second sidewall sections from said lower wall section is less than the distance of said predetermined positions from said upper wall section.

6. The stackable coop of claim 2 wherein the outer configuration of said male locking member substantially corresponds to the inner configuration of said female locking member.

7. The stackable coop of claim 6 wherein said male locking members are adapted to be slidably received within said female locking members.

8. The stackable coop of claim 2 wherein said sidewall sections are comprised of plastic members having transversely extending rib members defining an open latticework.

9. The stackable coop of claim 8 wherein said upper and lower wall sections comprise plastic members having a plurality of air flow openings therethrough.

10. The stackable coop of claim 1 wherein each of said first pad means comprises at least one rib member which extends in a direction parallel to said sidewall section it is in alignment with, and wherein each of said corresponding second pad means comprise a plurality of laterally extending rib members extending transversely of the plane of said sidewall section it is in alignment with.

11. The stackable coop of claim 1 wherein said upper, lower and sidewall sections are made of plastic material, each of which comprises a plurality of rib members which define an open latticework.

12. The stackable coop of claim 11 wherein the inner surfaces of said upper, lower and sidewall sections are substantially smooth.

13. The stackable coop of claim 12 wherein there are four sidewall sections arranged between and joined to said upper and lower wall sections to define a substantially rectangular enclosure, and wherein there are two first reinforced pad means on said upper wall section in alignment with each of said sidewall sections, and two second reinforced pad means on said lower wall section in alignment with each of said sidewall sections.

14. The stackable coop of claim 1 wherein said recesses defined in said U-shaped members are aligned along a common axis, and wherein said side arms of at least one of said U-shaped members is angularly displaced about said common axis relative to said side arms of another of said U-shaped members.

15. The stackable coop of claim 14 wherein said protruding portions on said side arms of said U-shaped members extend along the length of said side arms which define said recess.

16. The stackable coop of claim 14 further including locking means for locking said door in said enclosed position.

17. The stackable coop of claim 16 wherein said locking means comprises locking rod means along an edge of said opening opposite from said hinge edge, and an U-shaped hinge locking member having side arms defining a recess therein for receiving said locking rod means therebetween, the gap between the outer edge of said side arms being less than the diameter of said locking rod means to firmly hold said locking rod means in said recess of said U-shaped hinge locking member.

18. The stackable coop of claim 14 wherein said hinge rod means comprises a plurality of hinge rod members aligned along a common axis and disposed adjacent said hinge edge of said section having said opening therein, and wherein said hinge means are disposed on said door.

19. The stackable coop of claim 14 wherein said side arms of a plurality of said U-shaped members include said protruding portions for firmly holding said associated portions of said hinge rod means in place in said recesses of said plurality of U-shaped members.

20. The stackable coop of claim 14 wherein said hinge means and said hinge rod means are made of plastic.

21. The stackable coop of claim 1 further including stack locking means on said upper and lower wall sections on each of said upper and lower wall sections for interlockingly holding said coops in vertical stacked arrangement when a plurality of said coops are stacked one on top of the other.

22. The stackable coop of claim 21 wherein said stack locking means comprise female locking members on one of said upper and lower sections, and male locking members on the other of said upper and lower sections, said male locking members being adapted to be received in slidable engagement with said female locking members when a plurality of said coops are stacked one on top of the other.

23. A stackable coop comprising:
upper and lower wall sections joined by a plurality of sidewall sections to form an enclosure, said sidewall sections being disposed about and joined to said upper and lower wall sections; and
a plurality of complementary first and second reinforced pad means on said upper and lower wall sections respectively in vertical alignment with said sidewall sections and spaced about the periphery of said upper and lower wall sections, said plurality of first pad means being disposed at spaced positions about the upper surface of said upper wall section to define a plurality of reinforced resting pads thereon, and said plurality of second pad means being disposed on the lower surface of said lower section in vertical alignment with said plurality of first pad means to define a plurality of reinforced support pads, each of said first reinforced pad means comprising at least one rib member extending in a first direction in relation to the plane of said sidewall section it is in alignment with, and each of said corresponding second pad means comprising at least one rib member extending in a second direction which is traverse to said first direction, said reinforced support pads being adapted to engage and rest on said reinforced resting pads of the coop positioned immediately therebeneath when a plurality of said coops are stacked vertically on top of one another so that substantially the entire weight of said coops positioned above one of said coops is borne by said sidewall sections of said one coop.

24. The stackable coop of claim 23 wherein each of said first pad means comprises at least one rib member which extends in a direction parallel to said sidewall section it is in alignment with, and wherein each of said corresponding second pad means comprise a plurality of laterally extending rib members extending transversely of the plane of said sidewall section it is in alignment with.

25. The stackable coop of claim 23 wherein said upper, lower and sidewall sections are made of plastic material, each of which comprises a plurality of rib members which define an open latticework.

26. The stackable coop of claim 25 wherein the inner surfaces of said upper, lower and sidewall sections are substantially smooth.

27. The stackable coop of claim 26 wherein there are four sidewall sections arranged between and joined to said upper and lower wall sections to define a substantially rectangular enclosure, and wherein there are two first reinforced pad means on said upper wall section in alignment with each of said sidewall sections, and two second reinforced pad means on said lower wall section in alignment with each of said sidewall sections.

28. The stackable coop of claim 23 further including stack locking means on said upper and lower wall sections on each of said upper and lower wall sections for interlockingly holding said coops in vertical stacked arrangement when a plurality of coops are stacked one on top of the other.

29. The stackable coop of claim 28 wherein said stack locking means comprise female locking members on one of said upper and lower sections, and male locking members on the other of said upper and lower sections, said male locking members being adapted to be received in slidable engagement with said female locking members when a plurality of coops are stacked one on top of the other.

* * * * *